(12) United States Patent
Bronfeld et al.

(10) Patent No.: US 6,308,144 B1
(45) Date of Patent: *Oct. 23, 2001

(54) METHOD AND APPARATUS FOR PROVIDING THREE-DIMENSIONAL MODEL ASSOCIATIVITY

(75) Inventors: Jason P. Bronfeld, Belmont; Girish Haran, Westford; Serena Marie Doyle, Hopkinton, all of MA (US)

(73) Assignee: Computervision Corporation, Needham, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/719,679

(22) Filed: Sep. 26, 1996

(51) Int. Cl.$^7$ .................................................. G06F 17/50
(52) U.S. Cl. .............................. 703/2; 345/121; 345/139; 345/213; 345/420; 345/436; 345/438; 345/214
(58) Field of Search ..................................... 707/501, 502; 345/139, 150, 157, 121, 433, 214, 427, 348, 419, 418, 436, 438, 213, 965; 364/468.04; 382/154; 703/2, 22, 1

(56) References Cited

U.S. PATENT DOCUMENTS

| | | | | |
|---|---|---|---|---|
| 4,847,605 | * | 7/1989 | Callahan et al. | 340/709 |
| 4,858,150 | | 8/1989 | Aizawa et al. | 364/522 |
| 5,255,359 | * | 10/1993 | Ebbers et al. | 395/161 |
| 5,268,998 | * | 12/1993 | Simpson | 395/127 |
| 5,297,241 | * | 3/1994 | Hinn, Jr. et al. | |
| 5,303,388 | * | 4/1994 | Kreitman et al. | 395/159 |
| 5,388,205 | * | 2/1995 | Cantor et al. | 395/162 |
| 5,452,414 | * | 9/1995 | Rosendahl et al. | 395/159 |
| 5,537,523 | * | 7/1996 | Harashima et al. | 395/140 |
| 5,708,764 | * | 1/1998 | Borrel et al. | 395/119 |

FOREIGN PATENT DOCUMENTS

| | | | |
|---|---|---|---|
| 0 640 943 A3 | 1/1995 | (EP) | G06T/17/40 |
| 8161383 | 6/1996 | (JP) | G06F/17/50 |

OTHER PUBLICATIONS

"3D Home Architect, Edition 2" (as early as Dec. 3, 1996) (3 pages total).
"SolidWorks 96" Brochure (as early as Dec. 3, 1996).
Intergraph Imagineer Brochure, Sep. 1996.
Intergraph Imagineer Fact Sheet, Oct. 1996.
D. Serrano and D. Gossard, "Constraint Management in MCAE," Third Internaitonal Conference on Applications of Artificial Intelligence in Engineering, Aug. 8–12, 1988, Los Angeles, CA.

(List continued on next page.)

*Primary Examiner*—Kevin J. Teska
*Assistant Examiner*—Thai Phan
(74) *Attorney, Agent, or Firm*—Lahive & Cockfield, LLP

(57) ABSTRACT

A CAD/CAM system provides a positive indication to a user that the user has located a cursor so that an object on a two-dimensional sketcher plane has been aligned with a point of interest within three-dimensional model geometry, even though the point of interest may not be within the two-dimensional sketcher plane. The object may be snapped to a projection of the point of interest onto a corresponding location on the two-dimensional sketcher plane. Additionally, an association may be defined so that further manipulation of the point of interest on the model within three dimensions will automatically result in corresponding re-location of the object on the two-dimensional sketcher plane. Additionally, to maintain an appropriate relationship among historical data of the CAD/CAM system, interim geometry, which was generated as a result of user actions performed since the user operated on a particular sketch, is removed prior to the user subsequently operating again on the particular sketch. The interim data is replaced with new data generated as a result of the subsequent sketch session.

64 Claims, 12 Drawing Sheets

OTHER PUBLICATIONS

J. Hopcroft and R. Karp, "An $n^{52}$ Algorithm for Maximum Matchings in Bipartite Graphs*," SIAM J Comput, vol. 2, No. 4, Dec. 1973.

R. Tarian, "Depth–First Search and Linear Graph Algorithms*", SIAM J Comput, vol. 1, No. 2, Jun. 1972.

D. Serrano and D. Gossard, "Constraint Management in Conceptual Design," Applications of Artificial Intelligence in Engineering, Aug. 1987, Boston, MA.

J. Stevenson, "Rigid Body Decomposition, A Variation Geometry Solving Technique," First draft May 14, 1994; first revision Mar. 23, 1994, Feb. 17, 1995.

* cited by examiner

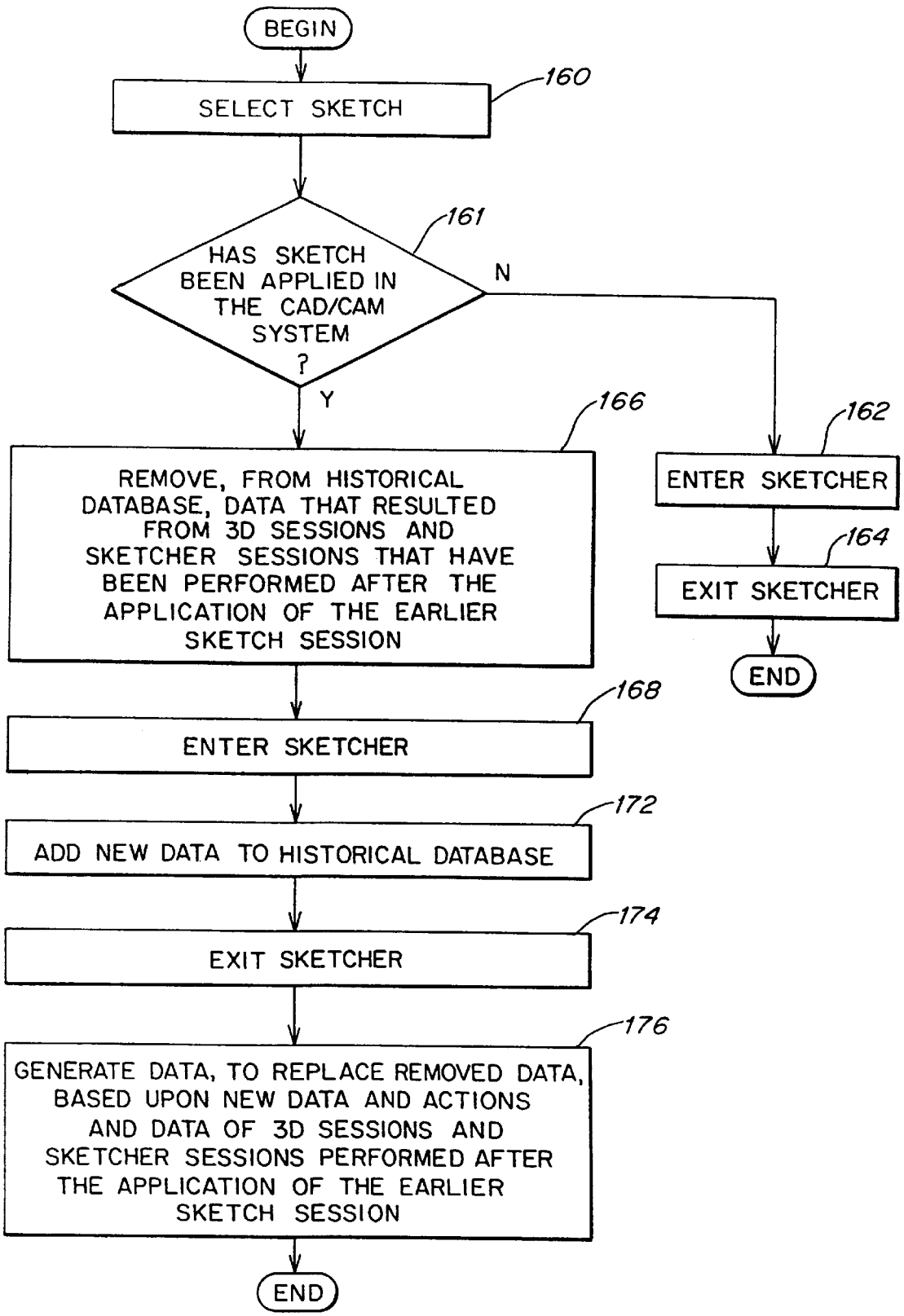

METHOD AND APPARATUS FOR PROVIDING THREE-DIMENSIONAL MODEL ASSOCIATIVITY

BACKGROUND OF THE INVENTION

1. Field of the Invention

The present invention relates to multi-dimensional modeling of solids in computer aided design and computer aided manufacturing systems. More particularly, the present invention relates to a sketching system that facilitates creation and manipulation of planar geometries within a three-dimensional workspace.

2. Discussion of the Related Art

In a typical computer aided design/computer aided manufacturing (CAD/CAM) system, a user interacts with the system to design a model that can later be used to manufacture a product according to the specifications of the model. During the design process, the user creates or sketches parts of the model on the computer system's display using various two-dimensional geometric primitives such as lines, arcs, circles, slots, rectangles, etc. that interact to form geometries that define the model being designed. Because such a model is typically used to manufacture a product that has three dimensions, a CAD/CAM system typically provides a capability for the user to enter and manipulate data that defines a three-dimensional model. However, most display devices typically used in CAD/CAM systems are inherently two-dimensional. As a result, special provisions and capabilities have been developed for CAD/CAM systems to facilitate the development and use of three-dimensional models, such as the ability to rotate the user's two-dimensional view through three-dimensional space while representing the designed model with accurate aspect views and size relationships.

One approach to allowing a user to design aspects of a three-dimensional model is to provide a sketcher on which the user can quickly yet accurately create geometric primitives and objects in two dimensions (referred to as planar geometry). The user can then map the planar geometry formed on the sketcher into three-dimensional space at a desired location, desired orientation, and depth to have the desired effect on the three-dimensional model. An example of a desired effect on a three-dimensional model is to bore a hole through part the model, the hole being represented by an extrusion of a geometry (e.g., a circle) from the sketcher. However, because the sketcher operates in two dimensions, it is often difficult for the user to visualize the effects of his two-dimensional sketching on the three-dimensional model, prior to the time at which the user maps the resulting planar geometry onto the three-dimensional model. Thus, it would be desirable to provide a facility by which a user operating a two-dimensional sketcher can concurrently view the results of the sketching operations in a three-dimensional work space that contains the three-dimensional geometry to which the sketched geometry will be mapped.

Additionally, because the user is working in a two-dimensional plane within the sketcher, it would be desirable to provide the capability for the user to designate elements of the planar geometry which are positioned relative to a point of interest within the three-dimensional space on an existing three-dimensional geometry, or to have other relationships to such a point of interest.

SUMMARY OF THE INVENTION

In accordance with one aspect of the invention, a CAD/CAM system is provided that provides a positive indication to a user when the user has located an object on a two-dimensional sketcher plane so that it is aligned with a point of interest within three-dimensional model geometry, even though the point of interest may not be within the two-dimensional sketcher plane. The object may be snapped to a projection of the point of interest on the sketcher plane. Additionally, an association may be defined so that further manipulation of the point of interest within the three-dimensional model will automatically result in corresponding re-location of the sketched object on the two-dimensional sketcher plane.

In accordance with another illustrative embodiment of the invention, a method and apparatus is provided within a CAD/CAM system so that the user can sketch an object in a sketcher plane while viewing a three-dimensional model over which the sketcher plane resides. The system may provide a capability so that the user can change the view in which the three-dimensional model is displayed on a display screen.

In another embodiment, a relationship can be created between a plurality of geometric entities during user operation of the sketcher, and the relationship will persist even after modifications by the user of one of the plurality of geometric entities in the three-dimensional model.

Another illustrative embodiment of the invention is directed to a method and apparatus for operating a CAD/CAM system, in which a representation of three-dimensional geometry is displayed on a display, a representation of an object that is on a two-dimensional plane is also displayed and a representation of a hotspot of the object on the display is displayed. Responsive to the user selecting and moving the hotspot, the object on the two-dimensional plane is moved across the display. In at least one embodiment the respresentations are all displayed concurrently.

In another embodiment, moving the object includes moving a cursor across the display to correspondingly move the hotspot. The moving of the object may also be responsive to the user moving the cursor over a point of interest on the representation of the three-dimensional geometry, and may include moving the object to a location that represents a projection of the point of interest onto the two-dimensional plane. An association may be created between the hotspot and the point of interest. After an association has been created, the system can automatically move the hotspot and the object to correspond to the user moving the point of interest within the three-dimensional geometry, so that the hotspot remains aligned with the point of interest. The hotspot may be moved so that the hotspot is positioned at a point on the two-dimensional plane that represents a projection, perpendicular to the two-dimensional plane, that intersects the point of interest.

In at least one embodiment, the display has a two-dimensional display plane, and the object is located on a two-dimensional plane that is different from the display plane. An indication may also be provided to the user that a potential association between the hotspot and a point of interest of the three-dimensional geometry exists.

Additionally, an indication may be provided to the user that a potential association between the hotspot and first one of a plurality of points of interest of the three-dimensional geometry exists. In one embodiment, an indication is provided to the user that a potential association between the hotspot and a second one of the plurality of points of interest of the three-dimensional geometry exists, in response to input by the user.

Another illustrative embodiment is directed to a method and apparatus for interpreting cursor position in a CAD/

CAM system having a cursor that is controlled by a user to manipulate elements of two-dimensional geometry that is concurrently displayed with elements of three-dimensional geometry, in which an an element of the two-dimensional geometry is respositioned in response to a first position of the cursor, and in response to a second position of the cursor, an indication is provided to the user of an element of the three-dimensional geometry that is displayed proximate the cursor. The two-dimensional geometry may be located on a two-dimensional plane that is different from a display plane upon which the two-dimensional geometry and three-dimensional geometry is displayed and the element may be repositioned based upon a transformation from the cursor position with respect to the display plane to a position on a two-dimensional plane.

Another illustrative embodiment is directed to a method and apparatus for maintaining a historical database in a CAD/CAM system in which a historical database represents actions by a user, and a facility by which the user modifies the historical database, in which it is detected that the user has selected the facility, and when the user has selected the facility to modify an aspect of the the historical database, entries in the historical database that relate to user actions that occurred since the aspect of the historical database was previously modified are deactivated. The user may then modify the aspect of the historical database to create new data, after which an evaluation is performed of the new data and the user actions that occurred since the aspect of the historical database was previously modified, to generate an updated geometric model indicative of the historical database. The entries may be deactivated by being deleted. Additionally, the CAD/CAM system may include a history tracking mechanism that evaluates the historical database to generate a geometric model in a manner in which the the geometric model is dependent upon an order in which the history tracking mechanism evaluates data within the historical database.

BRIEF DESCRIPTION OF THE DRAWINGS

Illustrative embodiments of the present invention will be described by way of example with reference to the accompanying drawings, in which:

FIG. 17 is a flowchart showing a process of another embodiment of the invention in which historical data is managed.

DETAILED DESCRIPTION

Figure 1:
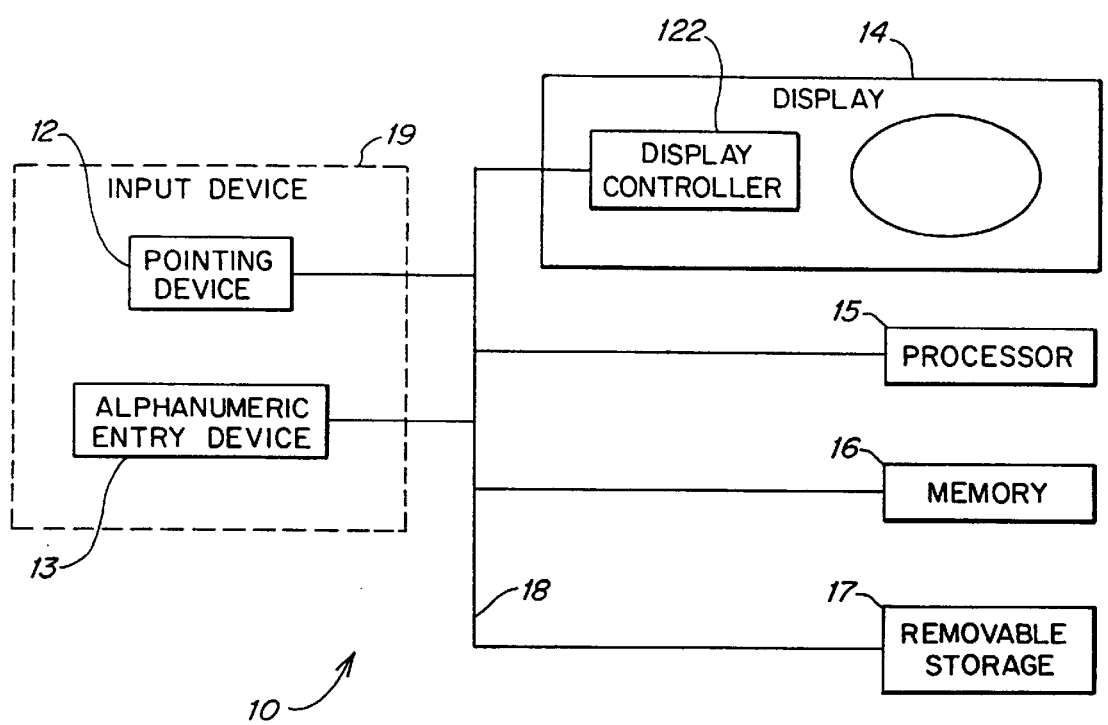
FIG. 1 illustrates an example of CAD/CAM system hardware on which aspects of the present invention can be implemented.

An illustrative CAD/CAM system 10 with which the present invention can be used is shown in FIG. 1. The system 10 includes a pointing device 12, an alphanumeric entry device 13, a display 14, a processor 15, a memory 16, and a removable storage device 17, all coupled together via a communications bus 18. It should be understood that this system 10 is shown merely for illustrative purposes, and that the present invention is not limited to use with a system having this specific configuration, as other configurations are possible. For example, in other CAD/CAM system configurations, the pointing device 12 can be coupled to the processor 15 via the display 14 or the alphanumeric entry device 13.

The pointing device 12 may, for example, be a puck, joystick, trackball, or mouse. The alphanumeric entry device 13 may include a keyboard that allows a user to provide textual, numeric, or other keyed inputs into the system 10. The pointing device 12 together with the alphanumeric entry device 13 may be referred to as an input device 19, which may also include other provisions by which a user may enter data, such as a voice command input device. The display 14 may be a CRT screen or similar device that allows the user to visualize his/her interactions with the CAD/CAM system 10, and includes a display controller 122 to translate information from the communications bus 18 into control information to control the display 14. The processor 15 may be a general purpose computer. The memory 16 may consist of memory devices such as hard disk drives or optical disk drives, RAM, ROM, or other memory devices and combinations thereof. The removable storage device 17 may be a CD-ROM drive, a tape drive, or a diskette drive. The removable storage device 17 is typically used to load, backup, or update the operating system of the CAD/CAM system 10, and to load application software including the CAD/CAM software.

CAD/CAM software, including code that implements aspects of the present invention, may be stored on some type of removable computer-readable storage media such as a CD-ROM, tape, or diskette. The software can be copied to a permanent form of storage media on the CAD/CAM system (e.g., a hard disk) to preserve the removable storage media for back-up purposes. When the CAD/CAM software of the invention is actually in use, the software is generally at least partially stored in RAM within memory 16, and is executed on the processor 15.

When running the modeling software on the CAD/CAM system 10, a user gives commands via the input device 19 to design a model on the system by adding geometric primitives such as curves, lines, arcs, circles, and rectangles, and specifying their dimensions and inter-relationships. A sketcher is one element of a CAD/CAM system 10 which allows a user to draw in a two-dimensional work space. Other elements such as object libraries can be used to create, view, and modify three-dimensional model geometries. The term "model geometry" as used herein refers to one or more geometric primitives that are interrelated to form a higher-level geometry on the system, whether created by the sketcher or other elements of the CAD/CAM system 10.

Figure 2:
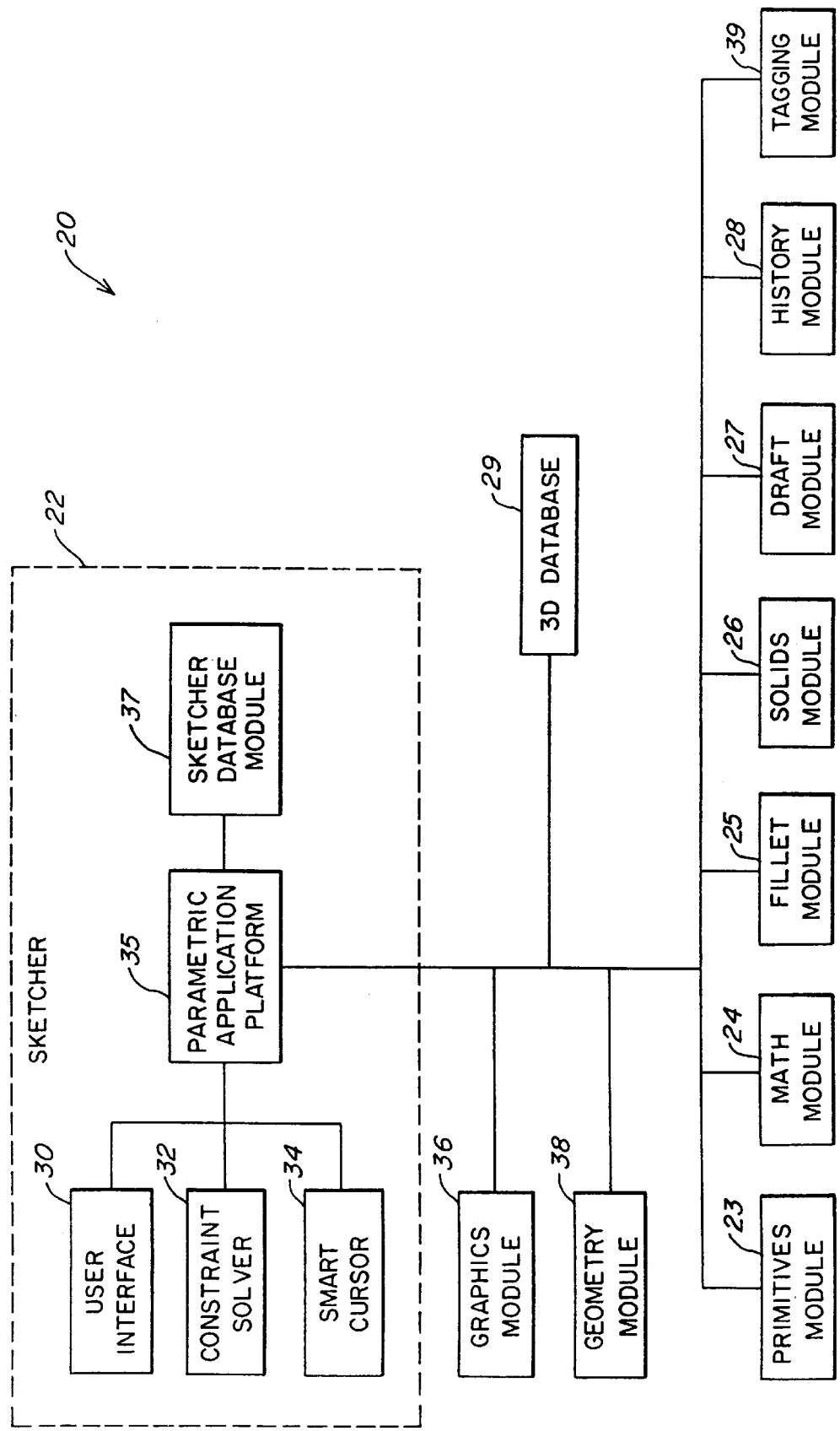
FIG. 2 is a block diagram of a CAD/CAM system that includes an embodiment of the invention.

FIG. 2 is a block diagram of a CAD/CAM system that includes an embodiment of the invention. The elements shown in FIG. 2 may be provided as software modules which are executed on processor 15 of the CAD/CAM system 10 (FIG. 1), as special purpose hardware, or any combination thereof. In particular, FIG. 2 illustrates a sketcher 22 coupled to a three-dimensional (3D) database 29. Also coupled to the sketcher 22 are several other modules, the functions of which are well known in the art of CAD/CAM systems. For example, these modules may include a graphics module 36, a geometry module 38, a primitives module 23, a math module 24, a fillet module 25, a shelling module 26, a draft module 27, a history module 28, and a tagging module 39. These modules that are not within the sketcher 22 are referred to collectively herein as three-dimensional modeling tools.

Generally, a module such as primitives module 23 is used to create primitives and designate parameters that define characteristics of the created primitives. Math module 24 is used to perform calculations such as differentiation and integration, by which the geometry of primitives are calculated. Fillet module 25 may be controlled to provide rounded edges of objects that would otherwise be sharp. A solids module 26 is used to add width to an object which has been created in two dimensions (e.g., created by using the sketcher 22) and thus initially has no width. Draft module 27 is used to add a small angle to at least one surface of a three-dimensional object so that the object may be manufactured in a mold and more easily removed therefrom. History module 28 keeps track of the design choices made by the user, and modifies the 3D database 29 accordingly, such as in response to the user changing the length of a line within the 3D model geometry. Tagging module 39 reports to the sketcher 22 data indicative of the state of the geometry as defined within the 3D database 29.

In one embodiment of the invention, sketcher 22 includes a user interface 30, a constraint solver 32, and a smart cursor 34, each of which is coupled to a parametric application platform 35. The parametric application platform 35 provides a facility by which user actions relating to the sketcher 22 may be represented by appropriate interface with a sketcher database module 37 to which the parametric application platform 35 is coupled.

Typically, a user creates a model by creating a geometric primitive (e.g., a box) within three-dimensional space. The user may then desire to add to or modify features of the primitive, or add additional primitives to the initial primitive to create a more complex model of a product. An aspect of the invention allows the user in such an instance to designate a two-dimensional sketching plane with reference to the 3D model geometry, sketch additional geometry within the two-dimensional plane while still viewing the model and the effects upon the model of the additional geometry, and then apply the additional geometry to the existing model geometry.

In many cases, the user will wish to align sketch geometry with points of interest on the model, such as edges, corners, or faces of a primitive (e.g., the box discussed above) of the model. Rather than requiring that the user align this sketch geometry manually by attempting to visualize and designate a location within three-dimensional space, an embodiment of the invention provides a positive indication to the user that a point of interest of the model geometry is currently aligned with an element of the sketched object, even though the point of interest may not be within the same two-dimensional plane in which the sketched geometry resides. Additionally, an embodiment of the invention can "snap" an element of the sketched object to a projection to the sketcher plane of a point of interest within the model geometry onto the sketcher plane, i.e., can align the element precisely with the point of interest when the element is located within a specified range about the point of interest.

Another useful function of the present invention is referred to herein as "model association," which refers to a relationship, between an element of the sketched object and a point of interest of the 3D model geometry, that will be maintained throughout current and subsequent modeling sessions of the same design. In other words, once a model association is created, the designated relationship is maintained even though the 3D model changes, so that changes to the points of interest in the 3D model can be propagated to corresponding changes to the location of the sketched object in the 3D model. One type of an association relationship supported by the present invention is that a reference point of the sketched object in the sketcher plane can be positioned at a projection from the point of interest on the 3D model, with the projection being defined by a vector that is perpendicular to the sketcher plane, wherein the vector passes through the point of interest on the 3D model and also through the reference point on the sketched object. For this type of association relationship, the sketched object will be displayed by the sketcher 22 so that the reference point on the sketched object is located at a point on the sketcher plane through which passes an imaginary line perpendicular to the sketcher plane which also passes through the point of interest on the 3D model. Several of these concepts will be clarified by a description of an exemplary modeling session as described below.

Figure 3:
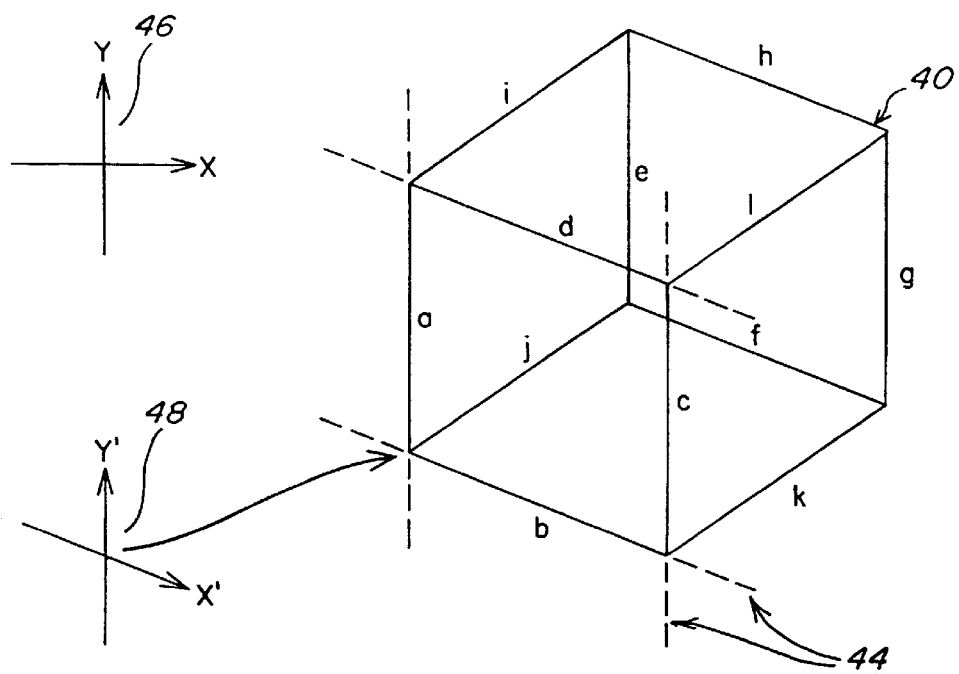
FIG. 3 is an example of a display view which may be observed by a user of a CAD/CAM system when the user has created a three-dimensional model sketcher plane.

FIG. 3 is a representation of an image shown on a display 14 of a CAD/CAM system 10 (FIG. 1), wherein the user has created a cube 40 in three dimensions. The cube 40 has a front face defined by lines a, b, c, and d, and a back face defined by lines e, f, g, and h. Line i connects the junction of lines a and d with the junction of lines e and h, line j connects the junction of lines a and b with the junction of lines e and f, line k connects the junction of lines b and c with the junction of lines f and g, and line 1 connects the junction of lines c and d with the junction of lines g and h.

With respect to the cube 40, the user has designated a sketcher plane 44 as being a plane which is coincident with the plane containing lines a, b, c, and d. It should be understood that it is not necessary that the sketcher plane 44 be coincident with an element of a three dimensional object such as the cube 40. Instead, for example, the sketcher plane 44 could have been placed a distance away from the cube 40, or could have been designated as a plane that intersects and is not parallel with any of the faces which define the cube 40.

The display plane coordinates X and Y 46 are illustrated in FIG. 3. In FIG. 3, the view shown is the view seen on display 14, so that the display plane coordinates X and Y 46 are within the plane of the paper on which FIG. 3 is drawn. The sketcher plane has coordinates X' and Y' 48. In the example illustrated, sketcher coordinate X' is coincident with line b, and coordinate Y' is coincident with line a.

Figure 4:
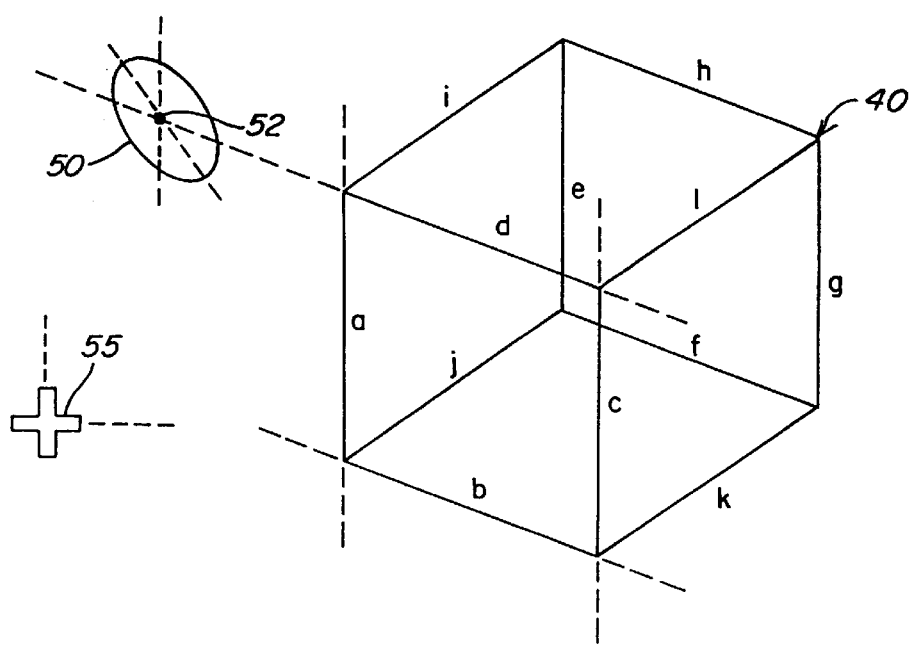
FIG. 4 shows a display view similar to that of FIG. 3, in which the user has sketched an object in the sketcher plane.

Once the user has designated the sketcher plane 44, the user may then "sketch" a planar geometry within the sketcher plane 44, as shown in FIG. 4, which shows a circle 50 that the user has sketched in a position to the left of cube 40. Because the user is working within the sketcher plane 44, the plane defined by the circle 50 is the same as the plane defined by the front face of the cube 40, since both of these planes are on sketcher plane 44. The circle 50 appears elliptical in FIG. 4, because the sketcher plane 44, on which the circle 50 is represented, is not parallel with the screen plane in this example. However, the CAD/CAM system 10 can provide a mechanism by which the user can effectively "rotate" the model geometry so that the screen plane could be parallel with the sketcher plane 44.

Often, it is desirable for a user to first sketch a primitive to create an object such as circle 50, and then move the object to a desired location on the 3D model. One embodiment of the invention provides a entity referred to as a "hotspot" which facilitates such movement. A hotspot is a location associated with a geometric primitive that is activated so that the hotspot may be manipulated by the user to correspondingly manipulate the associated geometric primitive. For example, when the circle 50 was drawn by the user, the sketcher displayed a graphic image 52 to represent such a hotspot at the center of the circle, which the user can select and manipulate to move the circle 50. For this purpose, a cursor 55 is displayed, which may be controlled by the user, typically by the pointing device 12. For example, if the pointing device 12 is a mouse, then the user moving the mouse a certain distance to the right will cause the cursor 55 to move along coordinate X of the screen plane.

Figure 5:
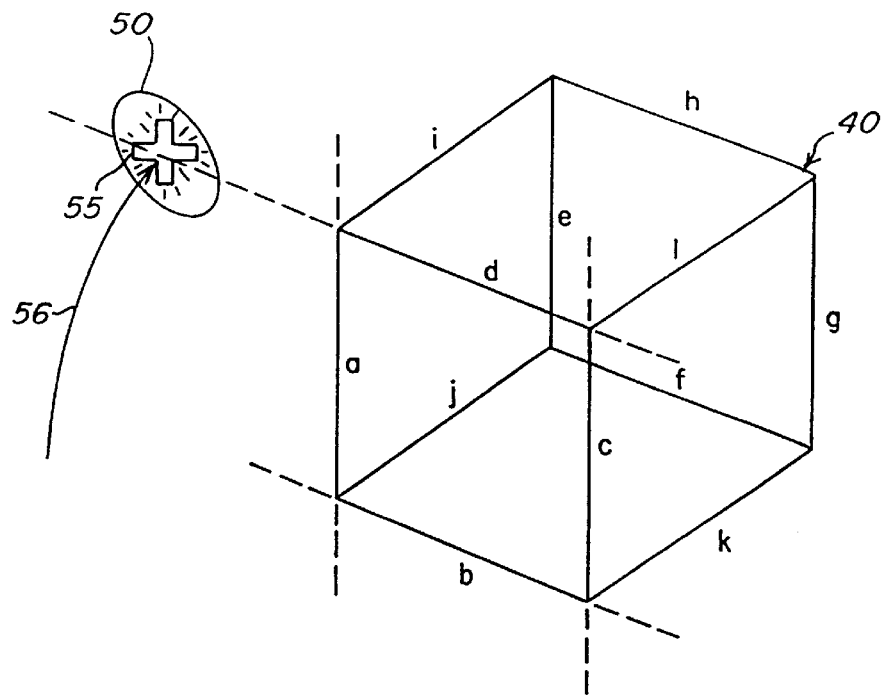
FIG. 5 is a display view similar to that of FIG. 4, in which a cursor has been placed over the object within the sketcher plane and the object has been selected.

As shown in FIG. 5, the user may thus control the cursor 55 to be displayed over the graphic image of the hotspot 52 of the circle 50, at which time the user can activate a mouse button or other element of input device 19 to indicate that the circle 50 is "selected." Once the circle 50 is selected, subsequent movement of the cursor 55 causes the circle 50 to move along with the cursor 55.

Figure 6:
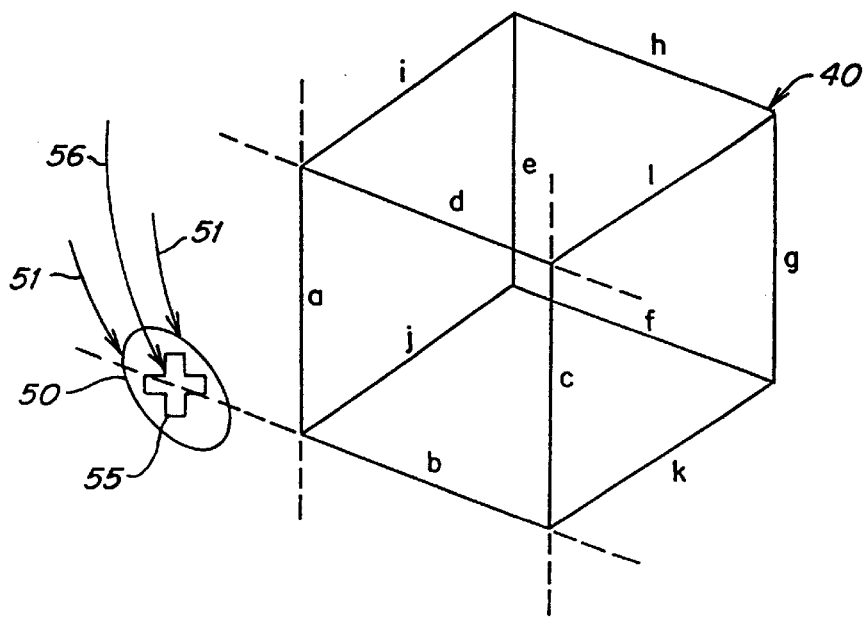
FIG. 6 is a display view similar to that of FIG. 5, in which the object within the sketcher plane has been moved in response to movement of the cursor.

Such motion is shown in FIG. 6, wherein the cursor has been moved down the screen plane Y axis and to the right along the screen plane X axis. This movement on the display screen axes is transformed into motion on the sketcher plane 44. In particular, the Y axis of the screen plane is parallel with the Y' axis of the sketcher plane, so the translation in this direction is identical. However, motion along the X axis of the screen plane translates to corresponding motion of circle 50 along both the X' and Y' axes of the sketcher plane 44.

Figure 7:
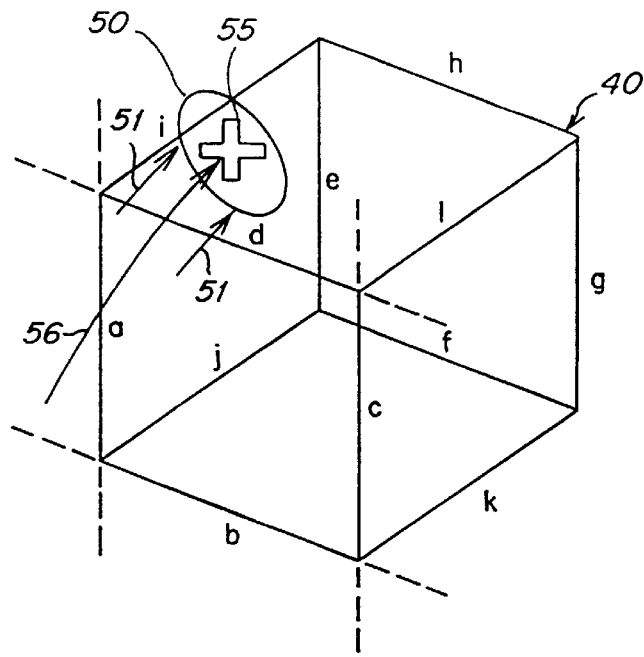
FIG. 7 is a display view similar to that of FIG. 6, in which the object within the sketcher plane has been further moved in response to movement of the cursor.

FIG. 7 shows further motion of the circle 50 in response to movement of the cursor 55. In particular, the user has moved the cursor toward the upper portion of line e as represented in the screen plane. Accordingly, because such motion is projected for the circle 50 in the sketcher plane 44, the current location of the circle 50 is within the sketcher plane 44 but above line d.

As indicated earlier, it is often desirable for a user to be able to align a point of interest on a sketch object with a point of interest on the underlying 3D model geometry. For example, the user may wish to align the center of the circle 50 with the line e. One approach would be for the user to determine a location within the sketcher plane 44 that corresponds to line e, and then move the cursor accordingly. In the illustrated example, the user could determine that line a represents a projection of line e onto the sketcher plane 44, so the user could move the cursor to a location on line a. However, such action by the user is unnecessary when using one embodiment of the present invention, which provides a powerful tool which automatically provides such alignment.

Figure 8:
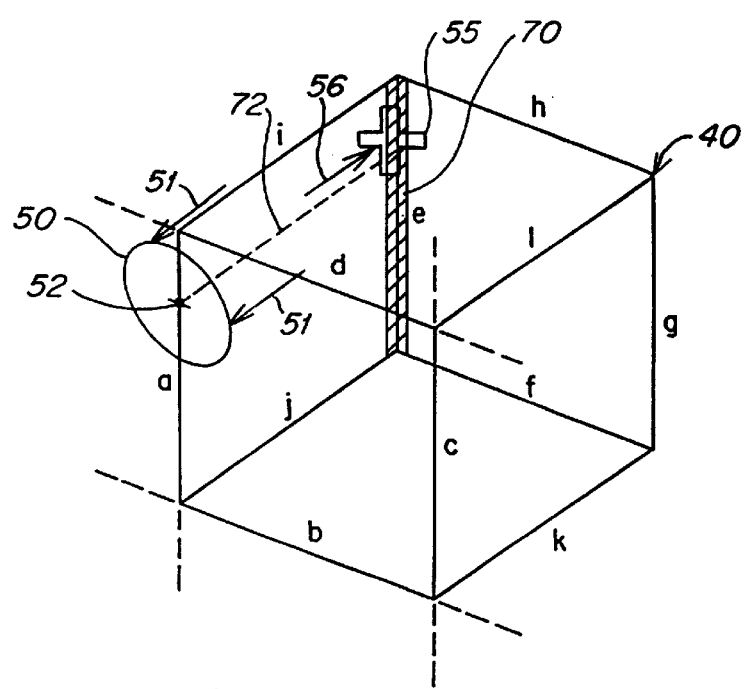
FIG. 8 is a display view similar to that of FIG. 7, in which the object within the sketcher plane has been automatically moved in response to the cursor being located near a point of interest within the three-dimensional model geometry.

As shown in FIG. 8, as the user causes the cursor 55 to approach the line e, an embodiment of the present invention causes the circle 50 to separate from the cursor 55 and be displayed over line a. This separation occurs automatically (i.e., without user input) when the cursor 55 passes over a point of interest in the model (i.e., the line e in the illustrated example). Upon separation from the cursor, the selected geometry (i.e., the circle 50 in the example) is displayed over the projection (i.e., line a in the example) onto the sketcher plane 44 of the point of interest over which the cursor 55 lies. Additionally, a graphic indicator 70 is displayed at the location of line e, to indicate to the user that the cursor 55 is located at a point of interest on the model geometry. The graphic indicator 70 may be a dark hatched line as shown in FIG. 8, a changing of color of line e, or any of a number of other techniques. For example, the color of the lines a–l may normally be brown, but when a particular line represents a point of interest at which the cursor 55 is located (e.g., line e), the color of the particular line may be changed to yellow. It should be understood that the other lines a–d and f–l also represent points of interest, each of which may be selected by positioning the cursor 55 appropriately over a corresponding location the model.

The proximity of the cursor to the point of interest which is sufficient to trigger an indication of alignment (e.g., graphic image 70) may be adjusted so that the CAD/CAM system 10 has a selectable sensitivity for such alignment. For example, the CAD/CAM system 10 may require that the center point of the cursor 55 be precisely over a point of interest, or within a certain alignment zone about the point of interest. In one embodiment, the proximity for alignment indication is set by the system at a particular number of pixels that represent a width. For example, if the point of interest is a single point represented by a single pixel, the proximity area may include all pixels that are located within the particular number of pixels and surround the single pixel. The user has the capability to zoom in or out on the display screen, i.e., magnify or reduce the size of the image on the display. The effect of zooming in or out adjusts the sensitivity of the proximity area, which remains fixed at the specified number of pixels. In one embodiment, the alignment zone has a width of three pixels.

Once it has been positioned in the desired location, the system will automatically associate the circle 50 with the line e, unless the user indicates a contrary intention. To have the circle 50 simply remain at its present location without being associated to the 3D model, the user can first "deselect" the hotspot 52 of the circle 50, e.g., by releasing a button on the mouse, and then designate a constraint on the hotspot by defining a fixed position at which the hotspot 52 will be located. In another embodiment, such deselection is indicative that the association should not be created, and a positive action can be taken by the user to create the association. The effect of association, as discussed above, is that the CAD/CAM system automatically positions the circle 50 so that an imaginary line perpendicular to the sketcher plane 44 intersects both a point of interest (e.g., line e) on the 3D model and the hotspot of the circle 50. In FIG. 8, this association is shown as a dashed line 72, which connects a point along line e with the graphic image 52 of the hotspot of the circle 50. The dashed line 72 need not be shown on the display, but is provided in FIG. 8 to graphically illustrate the association.

The graphic image 70 may subsequently be removed to simplify the visual representation of the model, and need not be displayed because it was a temporary indicator to aid the user in selecting points of interest for association. To indicate that the hotspot has been "model associated," the graphic image 52 of the hotspot itself may be changed after the association is complete. In one embodiment, the color of the graphic image 52 of the hotspot changes to provide such indication.

Figure 9:
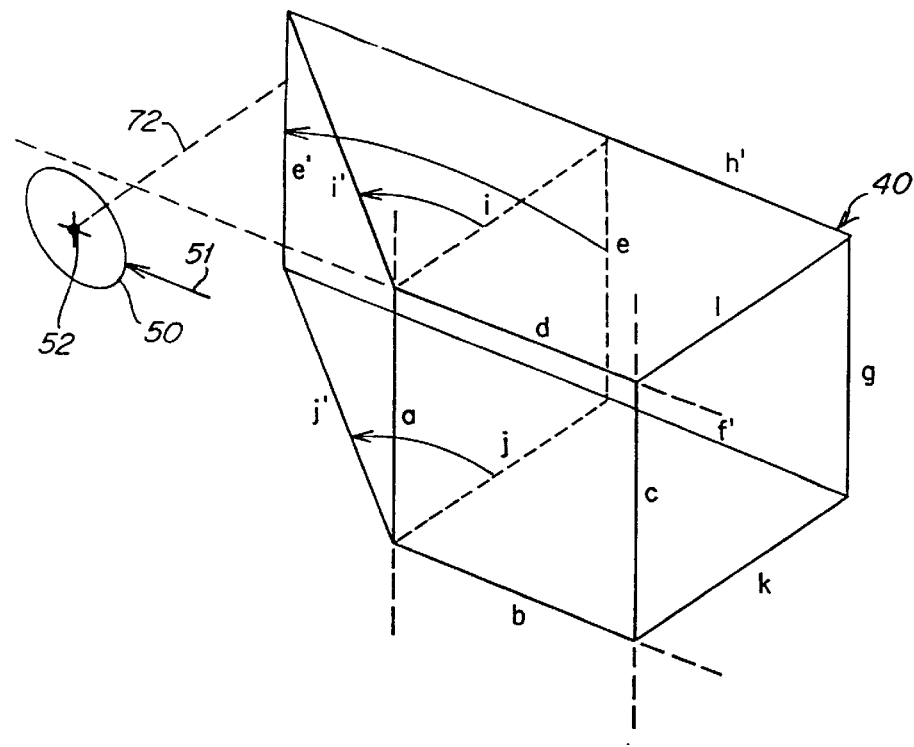
FIG. 9 is a display view similar to that of FIG. 8, in which the object within the sketcher plane has been associated with a line within the three-dimensional model geometry.

FIG. 9 illustrates the effect of the association 72 when the cube 40 is further manipulated. In this example, the user has completed sketching and has returned to a three-dimensional tool of the CAD/CAM system 10 to manipulate the 3D cube 40. Prior to this action, the design was represented as shown in FIG. 8. However, the user then uses the three-dimensional tool to move line e to a new location shown as line e' in FIG. 9. As a result of this motion and the model relationships designated earlier (e.g., the relationships that define the structure of the cube 40, such that a connection is maintained between the endpoints of cube lines), lines i' and j' represent the new locations of lines i and j respectively. The respective previous locations of lines e, i, and j are designated by dotted lines in FIG. 9. Additionally, line f and line h' each has been extended to still intersect its respective endpoint of line e'. Moreover, due to the association 72 between the circle 50 and line e, the circle 50 has been moved along the sketcher X' axis while remaining within the sketcher plane 44, so that its relationship to the line e' is maintained. If the association 72 had not been designated by the user, the circle 50 would have remained in its earlier location on line a, as shown in FIG. 8, even though line e had been repositioned.

Figure 10:
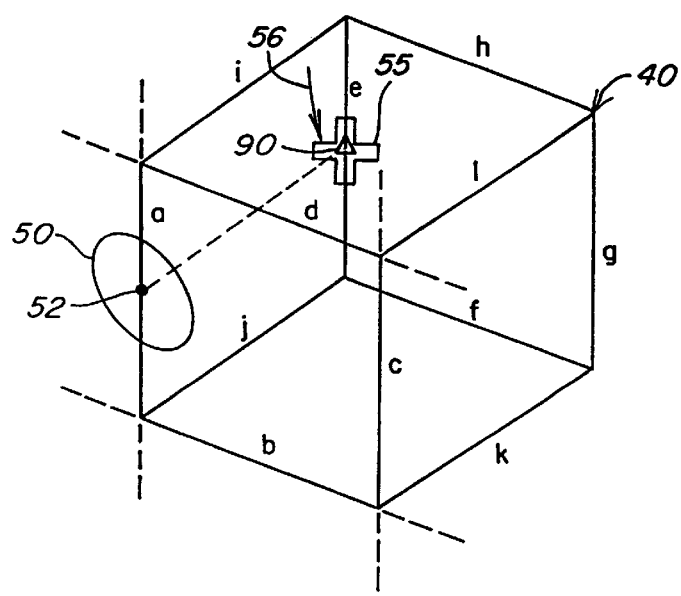
FIG. 10 is a display view similar to that of FIG. 8, but in which the object within the sketcher plane has been automatically moved in response to the cursor being located near a center point of interest within the three-dimensional geometry.

As indicated above, there may be many points of interest within a 3D model geometry, including any line or other element within the model geometry. FIG. 10 shows an example in which the center point of each of the lines a–l is also a point of interest. Accordingly, when the cursor is moved to be over the center point of line e, the triangular graphic image 90 is displayed at the center point of the line e to provide a visual indication to the user that the cursor is located over a point of interest, and the circle 50 is separated from the cursor 55 and displayed as being located with the graphic image of the hotspot 52 located at the center point of line a, which represents a projection of the center point of line e onto the sketcher plane 44.

Figure 11:
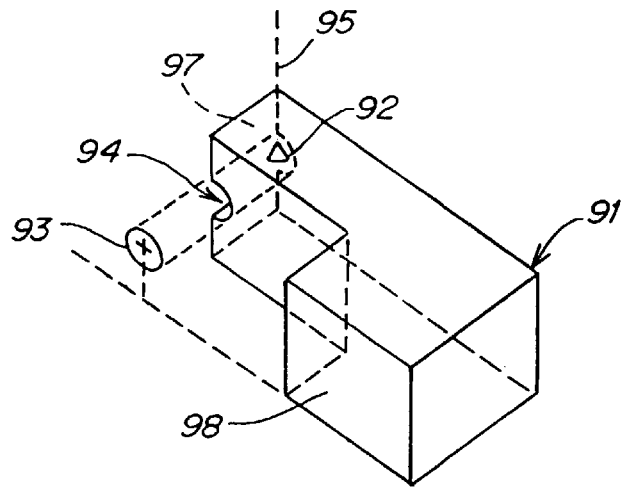
FIG. 11 is an example of a display view which may be observed by a user of a CAD/CAM system when the user has created a three-dimensional model using a 3D modeling tool, modified the model using the sketcher, and associated the sketched geometry to the 3D model.
Figure 12:
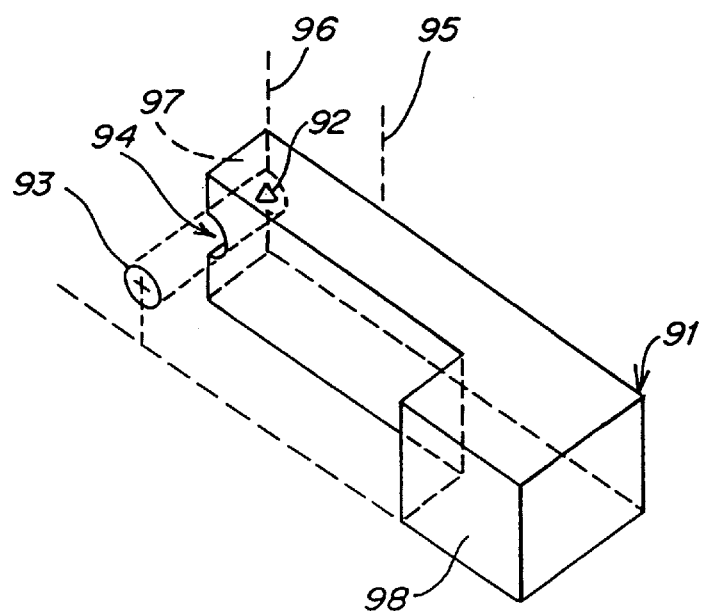
FIG. 12 is a display view similar to that of FIGS. 9 and 11, in which the user has moved a point of interest in the three-dimensional model, resulting in automatic corresponding movement of the sketched geometry associated therewith.

FIGS. 11 and 12 illustrate an example of how a user applies the concept of model association to create a design of a particular shape. FIG. 11 illustrates 3D model geometry 91, which is an L-shaped member. In this example, the user has sketched a circle 93 and positioned it on a sketcher plane that is parallel to a first face 98 of the member 91. Additionally, the user has associated the circle 93 with a point of interest 92 located on an edge of the member 91 that defines an edge of a second face 97 of the member 91. The point of interest 92 is not on the sketcher plane. The user, using a three-dimensional tool, has designated the circle 93 to define a hole and projected the hole through portion 94 of the face 97, so that the portion 94 of the face 97 is concave.

As illustrated in FIG. 11, the point of interest 92 is on an edge initially positioned at dotted line 95. Subsequently, as shown in FIG. 12, the user may relocate the face 97 of the member 91, and thus also relocate the point of interest 92 to be at a positioned identified by dotted line 96. Because the circle 93 is associated with the point of interest 92, the circle is automatically relocated in response to the relocation of the point of interest 92. As a result, the concave portion 94 remains on the face 97 of the member 91, without requiring that the user re-enter the sketcher to move the hole 93 to the new desired location.

Figure 13A:
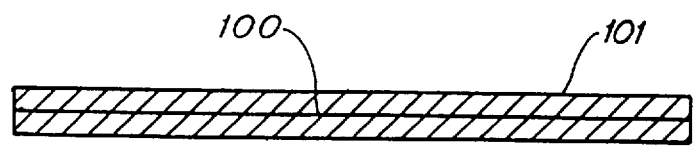
FIG. 13a is a diagram showing how a line may represent a point of interest.
Figure 13B:
FIG. 13b is a diagram showing how endpoints of a line may each represent a point of interest.
Figure 13C:
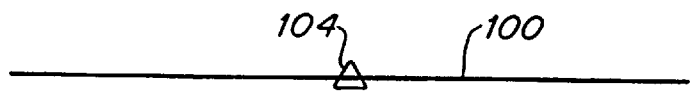
FIG. 13c is a diagram showing how a center point of a line may represent a point of interest.
Figure 13D:
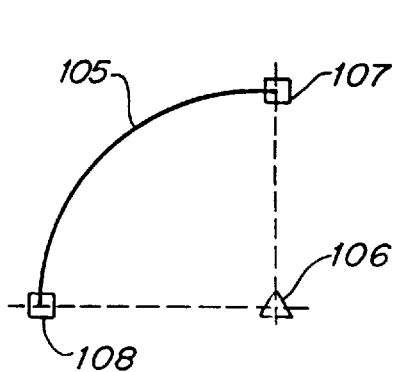
FIG. 13d is a diagram showing different elements within an arc which may represent a point of interest.
Figure 13E:
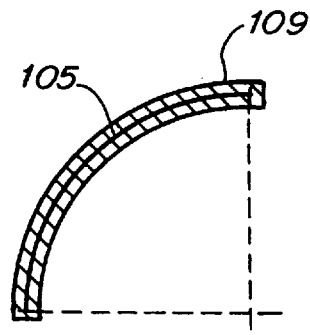
FIG. 13e is a diagram showing how an arc may represent a point of interest.

Other examples of points of interest are shown in FIGS. 13a–e. For example, line 100 itself may be a point of interest, as indicated by the shaded area 101 in FIG. 13a. In one embodiment, when a line 100 is a point of interest selected for association with a sketched object, the sketched object continues to be aligned with the nearest portion of the line 100, i.e., the sketched object is positioned so that its hotspot is located at a point which is closest to a projection of the line 100 onto the sketcher plane 44. FIG. 13b shows that the endpoints of the line 100 may also be points of interest, as indicated by graphic images 102 and 103. Additionally, the center point of the line 100 may be a point of interest as indicated by graphic image 104 in FIG. 13c. The center point of the arc 105 may be a point of interest, as indicated by graphic image 106 in FIG. 13d, or endpoints of an arc may each be a point of interest as indicated by graphic images 107 and 108 in FIG. 13d. Additionally, an arc itself may be a point of interest as shown in FIG. 13e.

It should be understood that the potential points of interest are not limited by the examples illustrated in FIG. 13, and that additional points of interest may be designated by the CAD/CAM system 10. Examples of such additional points of interest include a spline (a primitive similar to an arc but which has a varying radius) and a surface.

Figure 14:
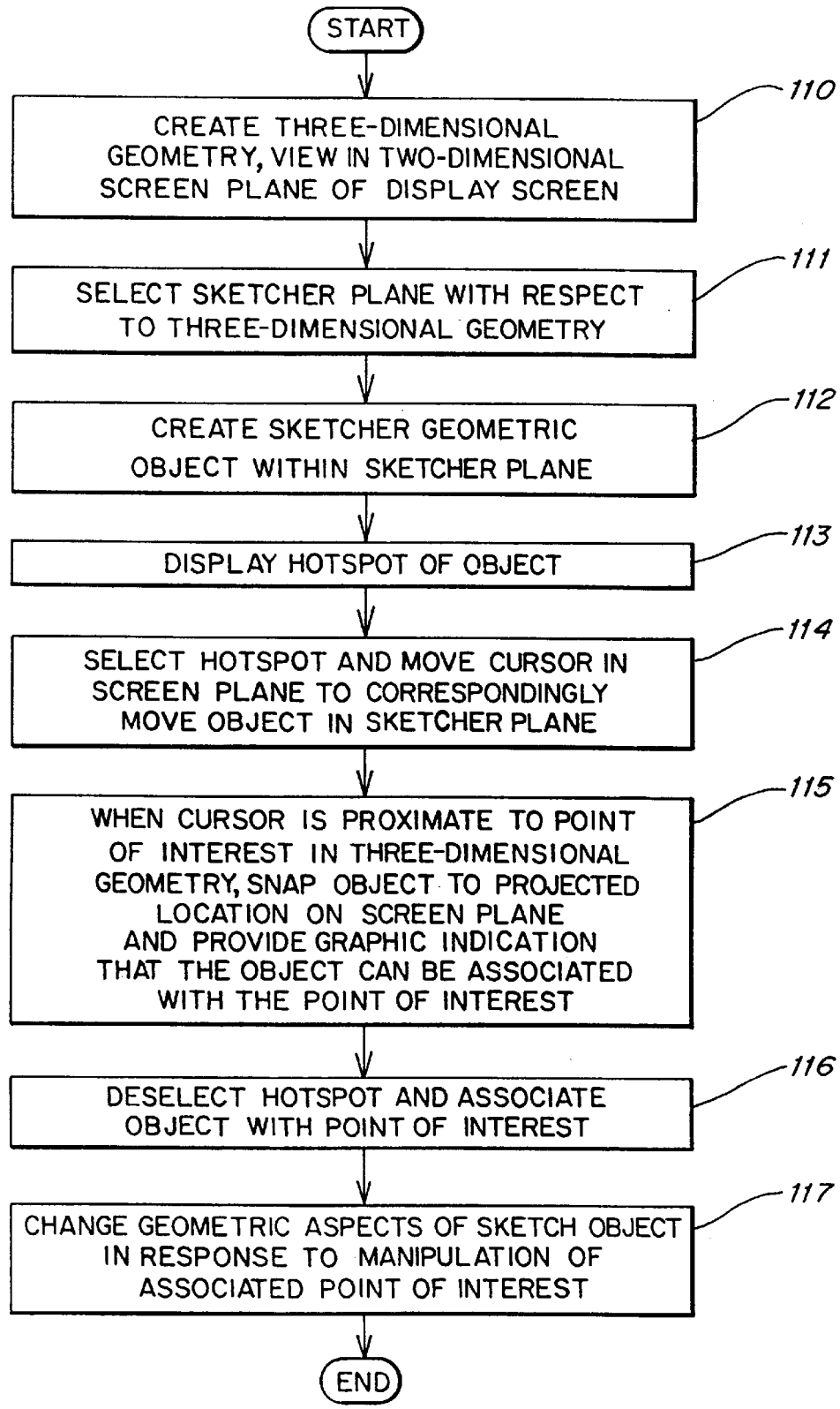
FIG. 14 is a process flow diagram showing steps, including steps taken by a user and steps performed by a CAD/CAM system, of a process in which planar geometry is created and manipulated with respect to a three-dimensional model geometry.

FIG. 14 is a process flow diagram which shows steps performed to practice one embodiment of the invention relating to model association. Some of the steps are performed by the CAD/CAM system 10, and some are performed by a user of the CAD/CAM system 10. In step 110, a three-dimensional geometry is created by the user and displayed on a two-dimensional screen of the CAD/CAM system (e.g., display 14 in FIG. 1) that includes screen including screen plane coordinates 46 (FIG. 3). To add an additional object to the design, the sketcher can be called and a sketcher plane selected by the user. The sketcher plane may be defined by the user with respect to an aspect of the three-dimensional geometry as indicated in step 111, but this is not necessary. For example, the sketcher plane may be parallel, perpendicular, or tangential to an aspect of the 3D model geometry, or may be completely unrelated thereto. Following step 111, an object may be created by the user within the sketcher plane (step 112), after which a graphic image representative of a hotspot of the object is displayed by the CAD/CAM system 10 (step 113). As indicated above with respect to FIGS. 3–10, in one embodiment of the invention the hotspot is displayed at the center of the sketched object, as illustrated by graphic image 52 which represents a hotspot that is the center of circle 50. However, other hotspots may be provided by the sketcher 22 rather than a center hotspot. For example, a point or a plurality of points on the edge of the circle 50 could instead be considered by the sketcher 22 as a hotspot, and thus be responsive to cursor selection.

After the object is created, its hotspot can be selected, and the cursor can be moved within the screen plane by the user to correspondingly move the object in the sketcher plane, as indicated in step 114. Then, when the cursor is proximate to the projection of a point of interest of the model geometry onto the screen plane, a visual indication is provided by the system that the point of interest can be associated with the object (step 115). This step can include snapping the object to be aligned with the projection of the point of interest, as also indicated in step 115. The hotspot can then be deselected by the user, which causes the system to associate the object with the point of interest, as indicated in step 1 16.

In one embodiment, the association is stored as a tag within the sketcher database module 37 that references the point of interest on the 3D model to the sketched object. Thus, when the primitive containing the point of interest on the 3D model is moved, the sketcher 22 can determine from the tag that an association exists with a sketched object. If no associations exist with any point of interest affected by modification of the 3D model geometry, then it is not necessary to update the location of any sketched objects. However, if an association does exist as indicated by the tag, then a new location of the sketched object is determined by re-evaluating the entries in the sketcher database module 37 that define the location of the sketched object.

A particular sketched object is defined by several entries in the sketcher database module 37, for example entries that define shape, size, location, the hotspot or hotspots of the sketched object, and the like. These entries can be a single object in an embodiment of the invention which uses object-oriented software or an object-oriented database. To update the location of the sketched object, the entry that defines the hotspot is queried to determine whether there is a reference to a point of interest in the 3D model geometry. Data which defines the location of the point of interest on the 3D model is stored within the 3D database 29, so the sketcher 22 queries the tagging module 39, which returns information from the 3D database 29 relating to the updated location of the point of interest. The projection of this updated location onto the sketcher plane 44 is determined using conventional techniques, and the hotspot is re-positioned on this projection. The sketched object is then located as defined by the new position of its hotspot.

If the user does not wish the sketched object to be associated with the point of interest, the user can override the association by assigning an explicit constraint to the object to fix its position at the current location. In such a case, the object would initially be aligned with the point of interest on the geometry model, but its location would not be fixed. If future actions moved the location of the point of interest, the object would still remain fixed at its previous position. If instead the object were to be associated with the point of interest, then when the point of interest is manipulated (e.g., moved), the appropriate geometric aspects (e.g., the location) of the object would be changed accordingly, as shown in step 117.

In one embodiment of the invention, step 110 is performed as a result of the user operating the three-dimensional tools such as the modules 23–28 (FIG. 2) and steps 111–116 are performed as a result of the user operating the sketcher 22. The user can then exit from the sketcher 22 and manipulates the 3D model geometry, and can move the associated point of interest. In step 117, the CAD/CAM system 10 detects that an associated point of interest has been moved, and in response re-activates the sketcher 22. Since there is an indication stored in sketcher database module 37 that the associated hotspot should be positioned relative to the position of the associated point of interest (i.e., with a line perpendicular to the sketcher plane passing between them), the sketcher 22 repositions the hotspot and thus the sketched object accordingly. The CAD/CAM system 10 then de-activates the sketcher 22, and the sketched object is displayed to the user as being positioned with respect to the point of interest. In this embodiment, the sketcher 22 is activated as a background task so that the user is not even aware that it has been activated, but is able to view the results of the association and the impact on the 3D model geometry.

Instead of re-activating the sketcher 22 to re-evaluate attributes of sketched geometries in response to a change to the 3D model, this re-evaluation could be performed by a 3D element of the CAD/CAM system 10 which is not within the sketcher 22. However, having the sketcher 22 perform this function may be advantageous. Each sketch created by the sketcher 22 can include a number of relatively simple primitives that are stored in the sketcher database module 37. The sketcher has a number of capabilities to evaluate the simple primitives to create a more complex geometry that is applied to the 3D model. One example of such a capability is constraint solving, i.e., resolving a multiple constraints in the presence of multiple unknowns. Another example of such a capability is automatic trimming, as discussed in patent application entitled "AUTOMATIC TRIMMING OF GEOMETRIC OBJECTS IN CAD/CAM SYSTEMS," Jason P. Bronfeld and Peter Revelas, filed on even date herewith, which is hereby incorporated by reference herein. The geometries and relationships are stored in the sketcher database module 37, rather than the final geometry to be applied into the 3D model.

Although the primitives, their interrelationships, and the capabilities of the sketcher could be duplicated in the 3D modeling tools, such duplication is unnecessary. Rather, to increase coding and storage efficiency, in one embodiment of the invention, the CAD/CAM system 10 system calls the sketcher to update the applied geometry whenever any change is made to the 3D model, with the capabilities of the sketcher being automatically invoked to update the complex geometry that is passed back to the 3D modeling tools.

Figure 15:
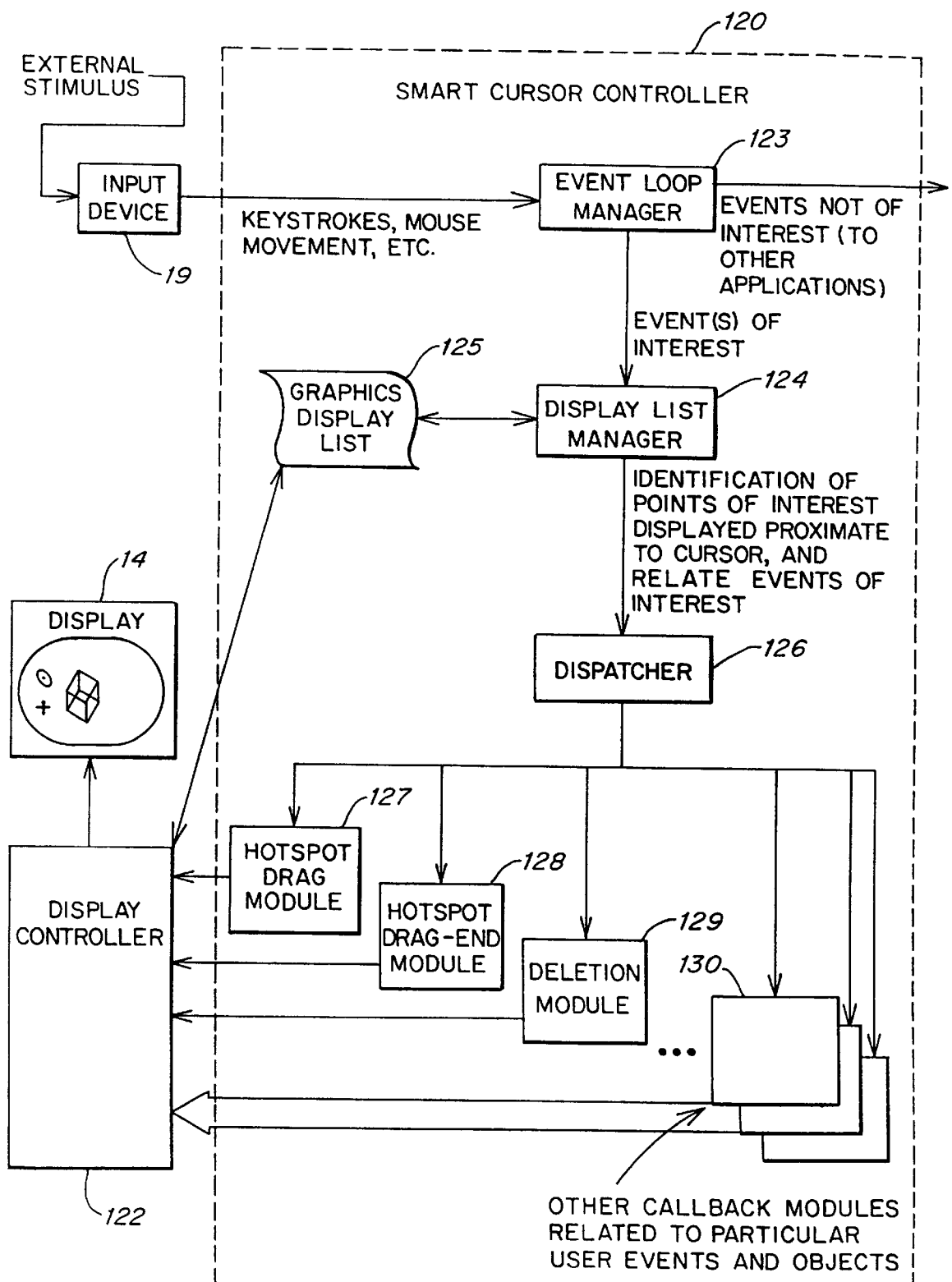
FIG. 15 is a block diagram illustrating an aspect of one embodiment of the invention.

FIG. 15 is a block diagram illustrating elements of one embodiment of the invention which facilitates the placement of an object within the sketcher plane in response to cursor movement across a three-dimensional model geometry and implements model association. In particular, FIG. 15 shows a smart cursor controller 120 which is coupled to the input device 19 and the display 14 via a display controller 122 (FIG. 1). The smart cursor controller 120 may be implemented as part of sketcher software which is executed by the processor 15 (FIG. 1), or may be implemented in hardware or in a combination of hardware and software. The display controller 122 may also be hardware, software, or a combination thereof.

In the embodiment of the invention shown in FIG. 15, the smart cursor controller 120 includes an event loop manager 123 coupled to the input device 19, and a display list manager 124 coupled to the event loop manager 123. The smart cursor controller 122 also includes a graphics display list 125 and a dispatcher 126. The graphics display list 125 is coupled to the display list manager 124 and the display controller 122. The dispatcher 126 is coupled to the display list manager 124.

In operation, the input device 19 receives external stimulus from a user, for example mouse movement or function key selection as discussed above with reference to FIGS. 3–10, and provides an output that provides an indication of such stimulus. The event loop manager 123 monitors the output of the input device 19, and determines when an event of interest has occurred. An event of interest is a user-defined action such as mouse movement that relates to operation of the sketcher 22. The events of interest are then provided to the display list manager 124. The display list manager 124 manages the run-time graphics displayed during a particular sketch session, which are stored as a graphics display list 125. The graphics display list 125 can be updated by other functions within the CAD/CAM system, for example by one of the three-dimensional object tools shown in FIG. 2 when such a tool is operated by the user. For a given cursor location updated when an event of interest occurs, the display list manager 124 determines the element or elements of the 3D model geometry and sketch geometry which are directly beneath or proximate the cursor 55.

The graphics display list 125 also contains indications of points of interest within the graphic elements, which are predetermined within the CAD/CAM system 10 as illustrated by the examples in FIG. 13. From the information within the graphics display list 125 and the events of interest provided by the event loop manager 123, the display list manager 124 determines points of interest that are displayed proximate to the cursor 55 on the display screen, and provides identification of these points of interest to the dispatcher 126. In response to the user events of interest and the identified objects, the dispatcher 126 calls one of a plurality of callback modules to perform an appropriate function. Modules which are closely related to model association include a hotspot drag module 127 and a hotspot drag-end module 128. Hotspot drag module 127 updates appropriate graphics and relationships in response to the user dragging a hotspot across the display screen. Hotspot drag end module 128 performs functions in response to the user ending a drag action with respect to a hotspot.

Additional callback modules are also provided, for example deletion module 129 which is responsive to the user deleting an object. Other callback modules 130 are responsive to other combinations of user events and currently-displayed objects. The callback modules 127–130 may provide several functions, such as updating the graphics representative of the hotspots, updating graphics of the objects themselves, updating the display of points of interest to indicate alignment and potential association, and actual association and disassociation of objects with respect to the points of interest. The results of the activities performed by the callback modules 127–130 cause either an update to the graphics to be displayed, or an update to tags which represent associations within the model geometry being operated on by the user. Thus, the display controller 122 will control the display 14 to display the appropriate representations of the model geometry.

Figure 16:
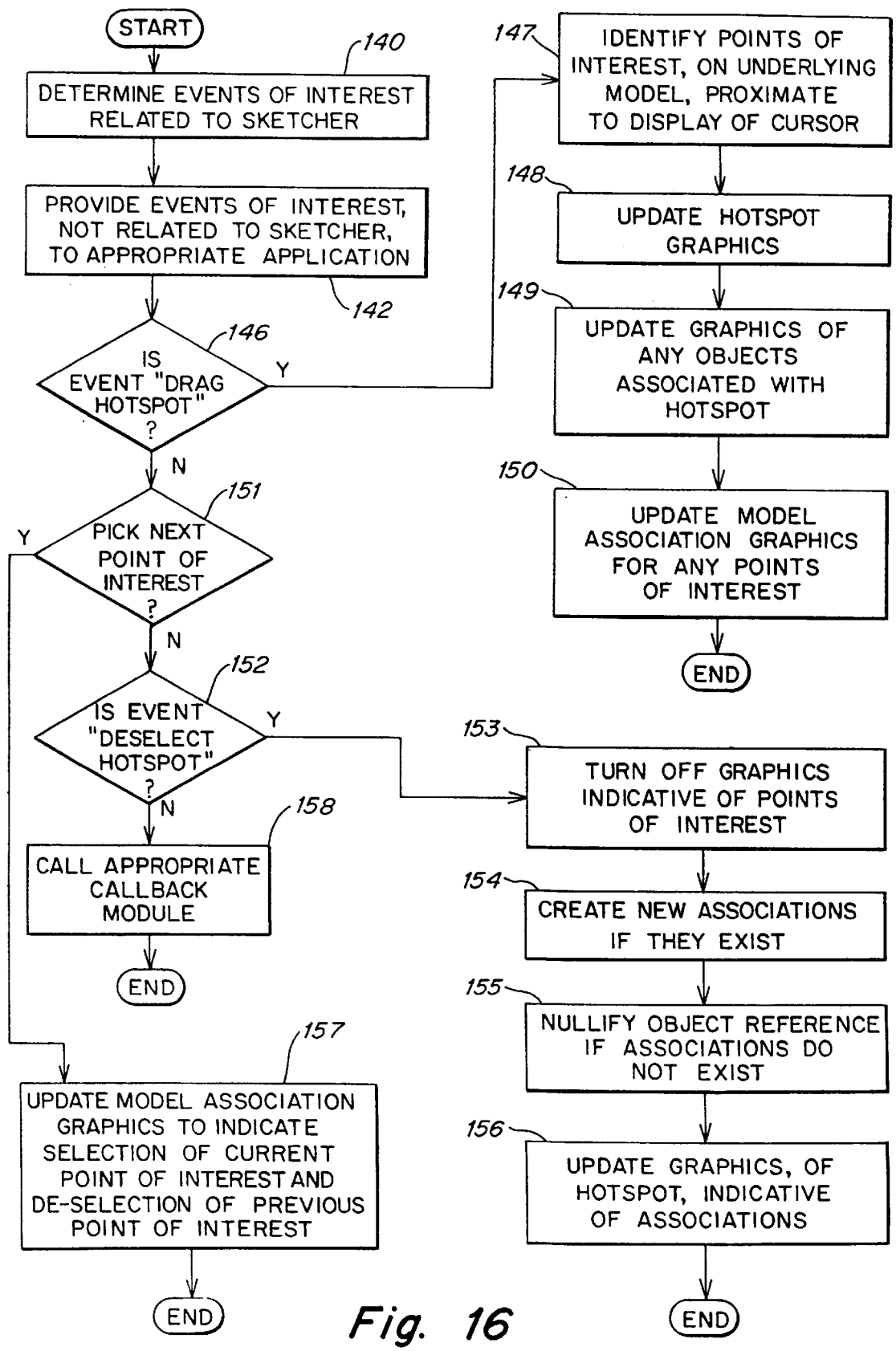
FIG. 16 is a flowchart showing a process of one embodiment of the invention, the steps of which may be performed by the elements shown in the block diagram of FIG. 15.

FIG. 16 is a flowchart showing steps of one embodiment of a routine for implementing the model association process of the present invention. In one embodiment, the routine of FIG. 16 is performed by the smart cursor controller 120, and in particular can be performed by software operating on processor 15. The process begins when a detection is made by the input device 19 that some type of external stimulus has occurred. In response to the external stimulus, events of interest that are related to the sketcher 22 are determined in step 140. Other events of interest, i.e., those not related to the sketcher 22, may be provided to the appropriate application not within the sketcher, as indicated in step 142.

In step 146, it is determined whether the event of interest is a "drag hotspot" event. If it is, then in step 147 the points of interest on the underlying geometric model which are within the specified distance of the display of the cursor are identified. Additionally, step 147 collects all the tags of the points of interest proximate the cursor. In one embodiment, the tags are collected by first accessing the graphics display list 125 to determine identifiers of the graphical elements that are proximate the cursor. The identifiers are passed to the 3D database 29, which returns the tags that are related to the graphical elements of the identifiers, since the 3D database 29 stores relationships between identifiers and tags. Additionally, in step 148, the hotspot graphics are updated, for example by representing a movement of a graphic image 52 that represents the hotspot. Also, the graphics of any objects associated with the hotspot are also updated to show movement of the object (step 149), for example the graphics that represent the circle 50 in the earlier example. Model association graphics are then updated for the points of interest identified in step 147 as underlying or being proximate the cursor 55, as indicated in step 150, and the routine then terminates. Step 150 may include changing the color of the graphic representation of a point of interest, or altering the graphic image itself, as discussed above. Other indications are also possible, for example an audible indication or a textual indication to the user.

If there is more than one point of interest which is proximate to the cursor, each is identified in step 147. However, only a first point of interest has its model association graphics updated in step 150. In one embodiment, the point of interest that is located nearest to the screen plane is automatically selected as the first point of interest. The user may select a second point of interest by depressing a mouse button, which will be detected in step 151, which determines whether the next point of interest should be picked. If so, then in step 157 the color of the first point of interest is changed back to its original color, and the color of the second point of interest is then changed to indicate selection. A subsequent depression of the mouse button, after each of the plurality of proximate points of interests has been viewed by the user, will result in the color of the first point of interest being changed again, due to another pass through step 157 caused by the event in which the user depressed the mouse button again.

If the event of interest is determined not to be a "drag hotspot" event in step 146, then in step 152, it is determined whether the event of interest is a "deselect hotspot" event. If it is, then in step 153 the graphics indicative of the points of interest are turned off and in step 154 any new associations are created if the cursor location, when the hotspot is deselected, is proximate another point of interest. The creation of an association involves recording, in the sketcher database module 37 in a location relating to the hotspot, the tag of the point of interest in the 3D model to indicate that an association exists, and modifying a data entry for the hotspot that indicates that the hotspot is associated with the particular point of interest. In step 155, if new associations do not exist anymore because the hotspot has been moved away from a point of interest with which it was previously associated, then the tag of the previous point of interest of the previously existing association is removed. Also, in step 156, the graphics of the hotspot are updated to be indicative of any existing associations.

If the event is not a "deselect hotspot" as determined by step 152, then the appropriate callback module is called as indicated in step 158. This may include a call to one of the other callback modules 129–130 as indicated in FIG. 15. After either step 150, step 156, or step 158, the process of FIG. 16 terminates, and it will be called again in response to a new stimulus.

In one embodiment of the invention, steps 148, 149, and 150 are performed by hotspot drag module 127 (FIG. 15), and steps 153, 154, 155, and 156 are performed by the hotspot drag end module 128 (FIG. 15).

As indicated above, an association may be represented by a data entry stored within the sketcher database module 37 that makes reference to the associated sketched object. The data entry, which may be stored as a parameter in a data structure that defines the hotspot of the sketched object, positions the particular sketched object by referencing a point of interest in the 3D model geometry. Thus, step 149 determines whether the data structure that defines the particular sketched object contains the data entry indicative of an association, and step 150 updates the association by replacing the existing data entry with a new data entry if an association previously existed, or by simply inserting the new data entry if an association did not previously exist.

In accordance with one embodiment of the invention, a user may view 3D model geometry while sketching new primitives using the sketcher 22, and can move the new primitives so that they are aligned with and associated with points of interest within the 3D model geometry. While the new primitives are being moved by the user, the cursor motion is performing two distinct actions, which provide a powerful capability for the user in creating and manipulating 3D designs. The first action performed by the cursor is to cause a repositioning of the new primitives on the two-dimensional sketcher plane based upon a translation from the cursor position (on the screen plane) to a position on the two-dimensional plane. The second action performed by the user is to obtain and react to information from all the geometry, including the 3D model geometry, that is underneath the cursor.

When the sketcher 22 is operated, commands and parameters relating thereto, received either from the user or other elements of the CAD/CAM system 10, are input and executed to produce the underlying 3D geometry, as described earlier. Many CAD/CAM systems support a historical tracking mechanism, in which the commands and parameters within the 3D database 29 are evaluated in a particular order, which is usually the order in which they were received and executed when the 3D database 29 was generated. History module 28 (FIG. 2) manages the historical relationship between the commands and parameters that created the 3D database. Much of the commands and parameters within the 3D database 29 is not commutative, i.e., the modeling results of the operations performed on this data is dependent upon the order in which the commands and parameters are is operated on.

When a user opens the sketcher 22, he specifies a particular sketch session, which may be a previously existing sketch session. It is therefore possible, in a CAD/CAM system which supports a historical tracking mechanism, for a user to modify an object in a previous sketch and create a new association to a 3D model geometry created as a result of an earlier application of the same sketch session. Since a first application of a sketch resulting from a first sketch session may be different from a second application of the same sketch as modified in a second sketch session, it would be advantageous to be able to resolve any differences between the first and second applications. To achieve this resolution, the modification of a sketch should be applied in the same context as that original sketch was applied. In other words, the state of the 3D model when the modified sketch is applied should be the same as the state of the 3D model when the sketch was originally applied.

Additionally, when a prior sketch is modified the potential exists for the CAD/CAM system to enter into an endless loop due to resulting circular dependencies. In particular, it is possible that a new association of the sketch object could be operated on by the CAD/CAM system to recreate the 3D model geometry that previously existed, thus repositioning the point of interest in the 3D model geometry upon which the association is based. This repositioning can cause a re-location of the sketch object due to the association of the sketch object with the point of interest. This modification of the sketch could in turn trigger another evaluation of the model and the association, to again reposition the point of interest, which begins the cycle once more.

An embodiment of the invention addresses these issues by effectively removing the interim data in the 3D model (i.e., the geometry generated as a result of user actions performed since the user first operated in the sketch session) prior to re-entering the sketch session, and then after the sketch modifications are complete, re-executing the commands in the history module to replace the interim data with new data generated as a result of the new sketch session. FIG. 17 is a process flow diagram, including several steps performed by the history module 28, illustrating one implementation of this embodiment of the invention.

The process begins when a sketch is selected by the user (step 160). In step 162, the history module determines whether the selected sketch has ever been applied to the 3D model in the CAD/CAM system 10. It is possible that the sketch was created but was never applied, i.e., was never extruded (given depth) or otherwise caused to interact with the 3D model geometry. Circular dependencies would not have been created if the sketch was never applied. Also, if the selected sketch is a new sketch, then circular dependencies also would not have been created.

Accordingly, if the selected sketch has not been applied, then in step 162, the sketcher is entered so that it can be operated on by the user, after which the sketcher is exited (step 164) without taking any particular action to preserve the impact on the 3D model. However, if the selected sketch has been applied as determined in step 161, then data that resulted from interim sessions (i.e., 3D sessions and sketcher sessions that have been performed after the earliest application to the 3D model geometry of the selected sketch session and the time when the routine of FIG. 17 is called) is removed from the 3D model (step 166). User commands and user-inputted data may remain, because this data is not dependent upon any action taken in the sketcher. Then, the sketcher is entered in step 168, and the user is free to modify the sketch and create new sketch data. The new sketch commands are added to the historical database as indicated in step 172, and the sketcher is then exited as indicated in step 174. Then, in step 176, new geometry is generated to replace the geometry removed in step 166, based upon the application of the new sketch data to the 3D model, and the commands and parameters of the 3D sessions and sketcher sessions that were performed after the earlier application of the selected sketch session.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended as limiting. The invention is limited only as defined in the following claims and the equivalents thereto.

What is claimed is:

1. A computer readable medium encoded with a program that, when executed on a computer aided design (CAD) system having a display, performs a method for operating the CAD system, the method comprising the steps of:

(A) displaying a representation of a three-dimensional geometry in a two-dimensional display plane on a display;

(B) responsive to the user sketching an object in a two-dimensional sketch plane that is not parallel to the two-dimensional display plane, displaying a representation of the object in the sketch plane on the display;

(C) displaying a representation of a cursor on the display; and (D) responsive to the user selecting the object and moving the cursor in the display plane, translating movement of the cursor in the display plane into movement of the object in the two-dimensional sketch plane.

2. The computer readable medium of claim 1, further comprising a step of displaying a representation of a hotspot of the object, and wherein step (D) is responsive to the user moving the cursor across the display to correspondingly move the hotspot.

3. The computer readable medium of claim 2, wherein:
   step (D) is responsive to the user moving a cursor within a predetermined proximity to a point of interest on the representation of the three-dimensional geometry; and
   step (D) includes creating an association between the hotspot and the point of interest.

4. The computer readable medium of claim 3, further comprising a step, responsive to the user moving the point of interest within the three-dimensional geometry, of correspondingly moving the hotspot and the object within the two-dimensional sketch plane so that the hotspot remains aligned with the point of interest.

5. The computer readable medium of claim 4, wherein the step of correspondingly moving the hotspot and the object within the two dimensional sketch plane includes moving the hotspot and the object within the two-dimensional sketch plane so that the hotspot is positioned at a point on the two-dimensional sketch plane that represents a projection, perpendicular to the two-dimensional sketch plane, that intersects the point of interest.

6. The computer readable medium of claim 3, wherein the display includes pixels, and wherein step (D) is responsive to the user moving the cursor to a location on the display that is within a predetermined number of pixels of the point of interest.

7. The computer readable medium of claim 6, wherein an area on the display that is a predetermined number of pixels defines a proximity area of the point of interest, the method further comprising the step of changing a magnification of the display while the predetermined number of pixels remains constant, to adjust a size of the proximity area in relation to the three-dimensional geometry.

8. The computer readable medium of claim 3, wherein the point of interest includes at least one of a midpoint of an arc that is located in the three-dimensional geometry, an endpoint of an arc that is located in the three-dimensional geometry, an entire arc that is located in the three-dimensional geometry, a midpoint of a line that is located in the three-dimensional geometry, an endpoint of a line that is located in the three-dimensional geometry, and an entire line that is located in the three-dimensional geometry.

9. The computer readable medium of claim 1, wherein:
   step (D) is responsive to the user moving the cursor within a predetermined proximity to a point of interest on the representation of the three-dimensional geometry; and
   step (D) includes moving the object to a location that represents a projection of the point of interest onto the two-dimensional sketch plane, in response to the cursor being within the predetermined proximity of the point of interest.

10. The computer readable medium of claim 9, wherein the step of moving the object to a location that represents of projection of the point of interest includes moving the object away from a location defined by a location of the cursor on the display.

11. The computer readable medium of claim 9, wherein the display includes pixels, and wherein step (D) is responsive to the user moving the cursor to a location on the display that is within a predetermined number of pixels of the point of interest.

12. The computer readable medium of claim 11, wherein an area on the display that is a predetermined number of pixels defines a proximity area of the point of interest, the method further comprising the step of changing a magnification of the display while the predetermined number of pixels remains constant, to adjust a size of the proximity area in relation to the three-dimensional geometry.

13. The computer readable medium of claim 9, wherein the point of interest includes at least one of a midpoint of an arc that is located in the three-dimensional geometry, an endpoint of an arc that is located in the three-dimensional geometry, an entire arc that is located in the three-dimensional geometry, a midpoint of a line that is located in the three-dimensional geometry, an endpoint of a line that is located in the three-dimensional geometry, and an entire line that is located in the three-dimensional geometry.

14. The computer readable medium of claim 1, wherein:
   step (D) includes creating an association between the hotspot and a point of interest of the three-dimensional geometry; and
   the method further comprises a step, responsive to the user moving the point of interest within the three-dimensional geometry, of correspondingly moving the hotspot and the object within the two-dimensional sketch plane so that the hotspot remains aligned with the point of interest.

15. The computer readable medium of claim 14, wherein the step of correspondingly moving the hotspot and the object within the two-dimensional sketch plane includes moving the hotspot and the object within the two-dimensional sketch plane so that the hotspot is positioned at a point on the two-dimensional sketch plane that represents a projection, perpendicular to the two-dimensional sketch plane, that intersects the point of interest.

16. The computer readable medium of claim 1, wherein step (D) includes providing an indication to the user that a potential association between the hotspot and a point of interest of the three-dimensional geometry exists.

17. The computer readable medium of claim 16, wherein the step of providing an indication to the user includes changing a display color of the point of interest.

18. The computer readable medium of claim 16, wherein the point of interest includes at least one of a midpoint of an arc that is located in the three-dimensional geometry, an endpoint of an arc that is located in the three-dimensional geometry, an entire arc that is located in the three-dimensional geometry, a midpoint of a line that is located in the three-dimensional geometry, an endpoint of a line that is located in the three-dimensional geometry, and an entire line that is located in the three-dimensional geometry.

19. The computer readable medium of claim 1, wherein:

step (D) includes creating an association between the hotspot and a point of interest of the three-dimensional geometry; and the method further comprises a step, responsive to the user moving the point of interest within the three-dimensional geometry, of correspondingly moving the hotspot and the object within the two-dimensional sketch plane so that the hotspot remains aligned with the point of interest.

20. The computer readable medium of claim 19, wherein the step of correspondingly moving the hotspot and the object within the two-dimensional sketch plane includes moving the hotspot and the object within the two-dimensional sketch plane so that the hotspot is positioned at a point on the two-dimensional sketch plane that represents a projection, perpendicular to the two-dimensional sketch plane, that intersects the point of interest.

21. The computer readable medium of claim 20, wherein the method further comprises the steps of:

creating an association between the hotspot and the point of interest in response to user input; and moving the hotspot and the object within the two-dimensional sketch plane so that the hotspot remains aligned with the point of interest, responsive to the user moving the point of interest within the three-dimensional geometry.

22. The computer readable medium of claim 1, wherein steps (A), (B), (C), and (D) are performed concurrently.

23. A computer readable medium encoded with a program that, when executed on a computer aided design (CAD) system having a cursor that is controlled by a user to manipulate elements of a two-dimensional geometry in a two-dimensional sketch plane, the elements being concurrently displayed with elements of a three-dimensional geometry displayed in a two-dimensional display plane, performs a method for interpreting a position of the cursor, comprising the steps of:

(A) positioning an element of the two-dimensional geometry in response to a first position of the cursor, wherein the two-dimensional geometry is sketched by a user in the two-dimensional sketch plane, and wherein the two-dimensional sketch plane is not parallel to the two-dimensional display plane; and (B) in response to the cursor being moved to a second position to reposition the element, providing, to the user, an indication of alignment of an element of the three-dimensional geometry with the cursor.

24. The computer readable medium of claim 23, wherein:

step (A) is responsive to the user controlling an input device to move the cursor from an initial position to the first position; and step (B) is responsive to the user controlling the input device to move the cursor from the first position to the second position.

25. The computer readable medium of claim 24, wherein the second position of the cursor represents an extension of a path from the first position to the second position.

26. The computer readable medium of claim 23, wherein:

step (A) is responsive to the user controlling an input device to move the cursor from an initial position to the first position by beginning a movement of the input device; and step (B) is responsive to the user controlling the input device to move the cursor from the first position to the second position by completing the movement of the input device.

27. The computer readable medium of claim 23, wherein:

the two-dimensional geometry is disposed on a two-dimensional plane that is different from a display plane upon which the two-dimensional geometry and three-dimensional geometry is displayed; and step (A) includes positioning the element based upon a transformation from the cursor position with respect to the display plane to a position on a two-dimensional plane.

28. The computer readable medium of claim 23, wherein step (B) includes changing a color of a point of interest on the three-dimensional geometry.

29. The computer readable medium of claim 23, wherein step (B) includes creating an association between the element of the two-dimensional geometry and a point of interest on the three dimensional geometry.

30. The computer readable medium of claim 23, wherein step (B) includes automatically relocating the element of the two-dimensional geometry away from the second position of the cursor.

31. The computer readable medium of claim 23, wherein the display includes pixels, and wherein step (B) is responsive to the second position of the cursor being within a predetermined number of pixels of a point of interest on the three-dimensional geometry.

32. The computer readable medium of claim 31, wherein an area on the display that is a predetermined number of pixels defines a proximity area of the point of interest, the method further comprising the step of changing a magnification of the display while the predetermined number of pixels remains constant, to adjust a size of the proximity area in relation to the three-dimensional geometry.

33. A CAD/CAM interface system comprising:

a display interface having an output that provides to a display, having a two-dimensional display plane, a representation of a three-dimensional geometry, a representation of an object sketched by a user in a two-dimensional sketch plane that is not parallel to the two-dimensional display plane, and a representation of a cursor on the display; and means, responsive to a user selecting the object and moving the cursor, for translating movement of the cursor in the display plane into movement of the object in the two-dimensional sketch plane.

34. The CAD/CAM interface system of claim 33, wherein the display interface includes means for displaying a representation of a hotspot of the object and wherein the means for translating is responsive to the user moving a cursor across the display to correspondingly move the hotspot.

35. The CAD/CAM interface system of claim 33, wherein:

the means for translating is responsive to the user moving a cursor within a predetermined proximity to a point of interest on the representation of the three-dimensional geometry; and the means for translating includes means for moving the object to a location that represents a projection of the point of interest onto the two-dimensional plane, in response to the cursor being within the predetermined proximity of the point of interest.

36. The CAD/CAM interface system of claim 35, wherein the means for of moving the object to a location that represents of projection of the point of interest includes means for moving the object away from a location defined by a location of the cursor on the display.

37. The CAD/CAM interface system of claim 35, wherein the display includes pixels, and wherein the means for translating is responsive to the user moving the cursor to a location on the display that is within a predetermined number of pixels of the point of interest.

38. The CAD/CAM interface system of claim 37, wherein an area on the display that is a predetermined number of pixels defines a proximity area of the point of interest, the CAD/CAM interface system further comprising means for changing a magnification of the display while the predetermined number of pixels remains constant, to adjust a size of the proximity area in relation to the three-dimensional geometry.

39. The CAD/CAM interface system of claim 35, wherein the point of interest includes at least one of a midpoint of an arc that is located in the three-dimensional geometry, an endpoint of an arc that is located in the three-dimensional geometry, an entire arc that is located in the three-dimensional geometry, a midpoint of a line that is located in the three-dimensional geometry, an endpoint of a line that is located in the three-dimensional geometry, and an entire line that is located in the three-dimensional geometry.

40. The CAD/CAM interface system of claim 33, wherein:
the means for translating is responsive to the user moving a cursor within a predetermined proximity to a point of interest on the representation of the three-dimensional geometry; and
the means for translating includes means for creating an association between the hotspot and the point of interest.

41. The CAD/CAM interface system of claim 40, further comprising means, responsive to the user moving the point of interest within the three-dimensional geometry, for correspondingly moving the hotspot and the object within the two-dimensional plane so that the hotspot remains aligned with the point of interest.

42. The CAD/CAM interface system of claim 41, wherein the means for correspondingly moving the hotspot and the object within the two dimensional plane includes means for moving the hotspot and the object within the two-dimensional plane so that the hotspot is positioned at a point on the two-dimensional plane that represents a projection, perpendicular to the two-dimensional plane, that intersects the point of interest.

43. The CAD/CAM interface system of claim 40, wherein the point of interest includes at least one of a midpoint of an arc that is located in the three-dimensional geometry, an endpoint of an arc that is located in the three-dimensional geometry, an entire arc that is located in the three-dimensional geometry, a midpoint of a line that is located in the three-dimensional geometry, an endpoint of a line that is located in the three-dimensional geometry, and an entire line that is located in the three-dimensional geometry.

44. The CAD/CAM interface system of claim 33, wherein the display includes pixels, and wherein the means for translating is responsive to the user moving the cursor to a location on the display that is within a predetermined number of pixels of the point of interest.

45. The CAD/CAM interface system of claim 44, wherein an area on the display that is a predetermined number of pixels defines a proximity area of the point of interest, the CAD/CAM interface system further comprising means for changing a magnification of the display while the predetermined number of pixels remains constant, to adjust a size of the proximity area in relation to the three-dimensional geometry.

46. The CAD/CAM interface system of claim 33, wherein:
the means for translating includes means for creating an association between the hotspot and a point of interest of the three-dimensional geometry; and
the CAD/CAM interface system further comprises means, responsive to the user moving the point of interest within the three-dimensional geometry, for correspondingly moving the hotspot and the object within the two-dimensional plane so that the hotspot remains aligned with the point of interest.

47. The CAD/CAM interface system of claim 46, wherein the means for correspondingly moving the hotspot and the object within the two dimensional plane includes means for moving the hotspot and the object within the two-dimensional plane so that the hotspot is positioned at a point on the two-dimensional plane that represents a projection, perpendicular to the two-dimensional plane, that intersects the point of interest.

48. The CAD/CAM interface system of claim 33, wherein the means for translating includes means for providing an indication to the user that a potential association between the hotspot and a point of interest of the three-dimensional geometry exists.

49. The CAD/CAM interface system of claim 48, wherein the means for providing an indication to the user includes means for changing a display color of the point of interest.

50. The CAD/CAM interface system of claim 48, further comprising:
means for creating an association between the hotspot and the point of interest in response to user input; and
means, responsive to the user moving the point of interest within the three-dimensional geometry, for moving the hotspot and the object within the two-dimensional plane so that the hotspot remains aligned with the point of interest.

51. The CAD/CAM interface system of claim 33, wherein the means for translating includes means for providing an indication to the user that a potential association exists between the hotspot and a first one of a plurality of points of interest of the three-dimensional geometry.

52. The CAD/CAM interface system of claim 51, further comprising means, responsive to input by the user, for providing an indication to the user that a potential association exists between the hotspot and a second one of the plurality of points of interest of the three-dimensional geometry.

53. The CAD/CAM interface system of claim 52, further comprising:
means for creating an association between the hotspot and the second one of the plurality of points of interest in response to user input; and
means, responsive to the user moving the point of interest within the three-dimensional geometry, for moving the hotspot and the object within the two-dimensional plane so that the hotspot remains aligned with the point of interest.

54. The CAD/CAM interface system of claim 33, wherein the means for translating includes means for moving the object while the display concurrently displays the representation of three-dimensional geometry, the representation of the object, and the representation of the hotspot.

55. In a CAD/CAM system having a cursor that is controlled by a user to manipulate elements of a two-dimensional geometry in a two-dimensional sketch plane, the elements being concurrently displayed with elements of a three-dimensional geometry displayed in a two-dimensional display plane, an apparatus for interpreting a position of the cursor, the apparatus comprising:

means for positioning an element of the two-dimensional geometry in response to a first position of the cursor, wherein the two-dimensional geometry is sketched by a user in the two-dimensional sketch plane, and wherein the two-dimensional sketch plane is not parallel to the two-dimensional display plane; and means for providing, to a user, an indication of alignment of an element of the three-dimensional geometry with the cursor, in response to the cursor being moved to a second position to reposition the element.

56. The apparatus of claim 55, wherein:

the means for repositioning is responsive to the user controlling an input device to move the cursor from an initial position to the first position; and the means for providing is responsive to the user controlling the input device to move the cursor from the first position to the second position.

57. The apparatus of claim 56, wherein the second position of the cursor represents an extension of a path from the first position to the second position.

58. The apparatus of claim 55, wherein:

the means for positioning is responsive to the user controlling an input device to move the cursor from an initial position to the first position by beginning a movement of the input device; and the means for providing is responsive to the user controlling the input device to move the cursor from the first position to the second position by completing the movement of the input device.

59. The apparatus of claim 55, wherein:

the two-dimensional geometry is disposed on a two-dimensional plane that is different from a display plane upon which the two-dimensional geometry and three-dimensional geometry is displayed; and the means for positioning includes means for repositioning the element based upon a transformation from the cursor position with respect to the display plane to a position on a two-dimensional plane.

60. The apparatus of claim 55, wherein the means for providing includes means for changing a color of a point of interest on the three-dimensional geometry.

61. The apparatus of claim 55, wherein the means for providing includes means for creating an association between the element of the two-dimensional geometry and a point of interest on the three dimensional geometry.

62. The apparatus of claim 55, wherein the means for providing includes means for automatically relocating the element of the two-dimensional geometry away from the second position of the cursor.

63. The apparatus of claim 55, wherein the display includes pixels, and wherein the means for providing is responsive to the second position of the cursor being within a predetermined number of pixels of a point of interest on the three-dimensional geometry.

64. The apparatus of claim 63, wherein an area on the display that is a predetermined number of pixels defines a proximity area of the point of interest, the apparatus further comprising means for changing a magnification of the display while the predetermined number of pixels remains constant, to adjust a size of the proximity area in relation to the three-dimensional geometry.

* * * * *